US011305865B2

(12) United States Patent
Lorenz

(10) Patent No.: US 11,305,865 B2
(45) Date of Patent: Apr. 19, 2022

(54) ARRESTING SYSTEM FOR ARRESTING A FIRST AIRCRAFT COMPONENT RELATIVE TO A SECOND AIRCRAFT COMPONENT

(71) Applicant: Airbus Operations GmbH, Hamburg (DE)

(72) Inventor: Christian Lorenz, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 410 days.

(21) Appl. No.: 16/448,080

(22) Filed: Jun. 21, 2019

(65) Prior Publication Data
US 2020/0001974 A1  Jan. 2, 2020

(30) Foreign Application Priority Data

Jun. 28, 2018 (DE) .......................... 102018115699.5

(51) Int. Cl.
*B64C 3/56* (2006.01)
(52) U.S. Cl.
CPC ...................................... *B64C 3/56* (2013.01)
(58) Field of Classification Search
CPC .... B64C 3/56; B64C 3/54; B64C 1/30; B64C 3/00; B64C 3/42; B64C 5/08; B64C 5/10;
(Continued)

(56) References Cited

U.S. PATENT DOCUMENTS 262,451 A * 8/1882 McFarlane ............. B62D 7/023
280/137.504
1,348,374 A * 8/1920 Plym ........................ B64C 3/00
244/123.8

(Continued)

FOREIGN PATENT DOCUMENTS

| CH | 225 916 | 2/1943 |
|---|---|---|
| DE | 1 680 186 | 9/1971 |
| EP | 3 000 723 | 3/2016 |

OTHER PUBLICATIONS

DMPA German Search Report for DE 10 2018 115 699.5 dated Apr. 4, 2019, 7 pages.

(Continued)

*Primary Examiner* — Medhat Badawi
(74) *Attorney, Agent, or Firm* — Nixon & Vanderhye P.C.

(57) ABSTRACT

A wing for an aircraft is disclosed having a fixed wing, and a foldable wing tip portion mounted to the fixed wing via a tip hinge rotatable about a tip hinge axis between an extended position and a folded position. An arresting device is provided that allows to arrest the foldable wing tip portion with respect to the fixed wing in a very precise position and at the same time can be engaged in a simple and quick manner, is achieved in that the wing includes an arresting system including a first hook mounted to the foldable wing tip portion and a second hook mounted to the fixed wing, wherein the first hook and the second hook are configured to be moved relative to one another between an arrested position, where the first and second hooks are engaged and relative movement of the first and second aircraft components is inhibited, and a release position, where the first and second hooks are disengaged and relative movement of the first and second aircraft components is allowed.

19 Claims, 3 Drawing Sheets

(58) Field of Classification Search
CPC . B64C 23/65; B64C 23/72; E05C 3/30; E05C 3/38; E05C 19/186; E05C 19/10; B64D 1/04; Y02T 50/30; Y02T 50/10
See application file for complete search history.

(56) References Cited

U.S. PATENT DOCUMENTS

| | | | | | |
|---|---|---|---|---|---|
| 1,779,113 | A * | 10/1930 | Carns | ............ | B64C 9/00 244/123.9 |
| 1,803,030 | A * | 4/1931 | Messerschmitt | ......... | B64C 3/00 244/123.8 |
| 1,804,823 | A * | 5/1931 | Blondin | ............ | B64C 3/00 244/123.1 |
| 1,806,586 | A * | 5/1931 | Christmas | ............ | B64C 3/00 244/123.4 |
| 1,819,794 | A * | 8/1931 | Schultze | ............ | B64C 3/56 244/49 |
| 1,956,823 | A * | 5/1934 | Carns | ............ | B64C 3/00 244/123.4 |
| 2,222,997 | A * | 11/1940 | Bellanca | ............ | B64C 3/54 244/90 R |
| 2,289,224 | A * | 7/1942 | Swanson et al. | ......... | B64C 3/56 244/49 |
| 2,292,613 | A * | 8/1942 | Chapman | ............ | B64C 3/54 244/218 |
| 2,375,075 | A * | 5/1945 | Carruth | ............ | B64D 47/06 362/470 |
| 2,420,433 | A * | 5/1947 | Kraaymes | ............ | B64C 3/54 244/218 |
| 2,468,425 | A * | 4/1949 | Carpenter | ............ | B64C 3/56 74/520 |
| 2,712,421 | A * | 7/1955 | Naumann | ............ | B64C 3/56 244/49 |
| 2,719,682 | A * | 10/1955 | Handel | ............ | B64C 3/56 244/49 |
| 2,720,369 | A * | 10/1955 | Detzer | ............ | B64C 25/26 244/102 SL |
| 2,881,989 | A * | 4/1959 | Flettner | ............ | B64C 27/26 244/6 |
| 2,881,994 | A * | 4/1959 | Michael | ............ | B64C 3/26 244/124 |
| 3,039,721 | A * | 6/1962 | Rogers, Jr. | ............ | B64D 37/04 244/135 R |
| 3,139,248 | A * | 6/1964 | Alvarez-Calderon | .... | B64C 3/42 244/207 |
| 3,333,792 | A * | 8/1967 | Alvarez-Calderon | .... | B64C 3/54 244/218 |
| 3,645,477 | A * | 2/1972 | Kratschmar | ............ | B64C 3/40 244/46 |
| 3,737,121 | A * | 6/1973 | Jones | ............ | B64C 3/40 244/13 |
| 4,061,195 | A * | 12/1977 | Pryor | ............ | A01B 73/044 172/456 |
| 4,228,977 | A * | 10/1980 | Tanaka | ............ | A63H 27/08 244/153 R |
| 4,245,804 | A * | 1/1981 | Ishimitsu | ............ | B64C 23/069 244/91 |
| 4,247,062 | A * | 1/1981 | Brueckner | ............ | B64C 5/08 244/36 |
| 4,247,063 | A * | 1/1981 | Jenkins | ............ | B64C 5/08 244/91 |
| 4,457,479 | A * | 7/1984 | Daude | ............ | B64C 5/08 244/203 |
| 4,497,461 | A * | 2/1985 | Campbell | ............ | B64C 9/00 244/99.3 |
| 4,598,885 | A * | 7/1986 | Waitzman | ............ | B64C 23/076 244/13 |
| 4,671,470 | A * | 6/1987 | Jonas | ............ | B29C 66/54 244/119 |
| 4,671,473 | A * | 6/1987 | Goodson | ............ | B64C 23/076 244/199.4 |
| 4,717,093 | A * | 1/1988 | Rosenberger | ............ | F42B 10/16 244/49 |
| 4,722,499 | A * | 2/1988 | Klug | ............ | B64C 23/076 244/199.4 |
| 4,824,053 | A * | 4/1989 | Sarh | ............ | B23Q 1/601 244/218 |
| 4,881,700 | A * | 11/1989 | Sarh | ............ | B60F 5/02 244/2 |
| 4,986,493 | A * | 1/1991 | Sarh | ............ | B60F 5/02 244/2 |
| 5,040,747 | A * | 8/1991 | Kane | ............ | B64C 25/26 244/102 R |
| 5,072,894 | A * | 12/1991 | Cichy | ............ | B64C 5/08 244/91 |
| 5,201,479 | A * | 4/1993 | Renzelmann | ............ | B64C 3/56 244/49 |
| 5,229,921 | A * | 7/1993 | Bohmer | ............ | G06F 1/1679 16/324 |
| 5,288,037 | A * | 2/1994 | Derrien | ............ | B64C 25/26 244/102 SL |
| 5,288,039 | A * | 2/1994 | DeLaurier | ............ | B64C 33/02 244/219 |
| 5,310,138 | A * | 5/1994 | Fitzgibbon | ............ | B64C 3/56 244/49 |
| 5,348,253 | A * | 9/1994 | Gratzer | ............ | B64C 23/069 244/91 |
| 5,350,135 | A * | 9/1994 | Renzelmann | ............ | B64C 3/56 244/49 |
| 5,356,094 | A * | 10/1994 | Sylvain | ............ | B64C 3/56 244/123.9 |
| 5,379,969 | A * | 1/1995 | Marx | ............ | B64C 3/56 244/49 |
| 5,381,986 | A * | 1/1995 | Smith | ............ | B64C 3/56 244/49 |
| 5,407,153 | A * | 4/1995 | Kirk | ............ | B64C 23/069 244/199.4 |
| 5,427,329 | A * | 6/1995 | Renzelmann | ............ | B64C 3/56 244/49 |
| 5,558,299 | A * | 9/1996 | Veile | ............ | B64C 3/56 244/49 |
| 5,645,250 | A * | 7/1997 | Gevers | ............ | B64D 27/00 244/101 |
| 5,988,563 | A * | 11/1999 | Allen | ............ | B64C 3/56 244/49 |
| 6,076,766 | A * | 6/2000 | Gruensfelder | ............ | B64C 3/56 244/130 |
| 6,190,484 | B1 * | 2/2001 | Appa | ............ | B29C 70/32 156/189 |
| 6,224,012 | B1 * | 5/2001 | Wooley | ............ | B60F 5/02 244/121 |
| 6,227,487 | B1 * | 5/2001 | Clark | ............ | B64C 23/072 244/99.12 |
| 6,260,799 | B1 * | 7/2001 | Russ | ............ | B64C 3/56 244/49 |
| 6,279,853 | B1 * | 8/2001 | Brighton | ............ | B64C 25/26 244/102 R |
| 6,345,790 | B1 * | 2/2002 | Brix | ............ | B64C 23/076 244/199.4 |
| 6,834,835 | B1 * | 12/2004 | Knowles | ............ | B64C 3/54 244/198 |
| 7,137,589 | B2 * | 11/2006 | Arata | ............ | B64C 27/26 244/6 |
| 7,497,403 | B2 * | 3/2009 | McCarthy | ............ | B64C 23/072 244/199.4 |
| 8,089,034 | B2 * | 1/2012 | Hammerquist | ............ | B64C 3/56 244/3.28 |
| 8,276,842 | B2 * | 10/2012 | Kracke | ............ | B64C 13/28 244/99.4 |
| 8,651,431 | B1 * | 2/2014 | White | ............ | B64C 23/076 244/218 |
| 8,733,692 | B2 * | 5/2014 | Kordel | ............ | B64C 23/072 244/49 |
| 8,777,153 | B2 * | 7/2014 | Parker | ............ | B64C 3/56 244/49 |
| 8,919,703 | B2 * | 12/2014 | Parker | ............ | B64C 7/00 244/215 |

(56) References Cited

U.S. PATENT DOCUMENTS

| | | | |
|---|---|---|---|
| 8,998,132 B2* | 4/2015 | Burris | B64C 9/04 244/99.3 |
| 9,162,755 B2* | 10/2015 | Guida | B64C 23/076 |
| 9,211,946 B2* | 12/2015 | Good | B64C 3/56 |
| 9,296,469 B2* | 3/2016 | Santini | B64C 3/56 |
| 9,415,857 B2* | 8/2016 | Fox | B64C 3/56 |
| 9,469,391 B1* | 10/2016 | Dong | B64C 23/076 |
| 9,469,392 B2* | 10/2016 | Fox | B64C 23/072 |
| 9,623,961 B2* | 4/2017 | Williams | E05B 85/04 |
| 9,701,392 B2* | 7/2017 | Whitlock | B64C 3/26 |
| 9,896,186 B2* | 2/2018 | Fong | B29C 70/222 |
| 9,908,612 B2* | 3/2018 | Fox | B64C 3/56 |
| 9,914,523 B2* | 3/2018 | Good | B64C 3/56 |
| 10,124,884 B2* | 11/2018 | Walke | F16H 25/14 |
| 10,189,557 B2* | 1/2019 | Boye | B64C 3/56 |
| 10,259,568 B2* | 4/2019 | Luce | G05G 5/06 |
| 10,501,167 B2* | 12/2019 | Kracke | B64C 3/56 |
| 11,066,148 B2* | 7/2021 | Elenbaas | B64C 13/34 |
| 2003/0155839 A1* | 8/2003 | Krimmer | H01F 7/1607 310/264 |
| 2004/0000619 A1* | 1/2004 | Barriety | B64C 3/52 244/219 |
| 2004/0262451 A1* | 12/2004 | McLean | B64C 3/10 244/45 R |
| 2005/0133672 A1* | 6/2005 | Irving | B64C 23/072 244/201 |
| 2005/0230531 A1* | 10/2005 | Horinouchi | B64C 3/40 244/47 |
| 2005/0276657 A1* | 12/2005 | Yumikino | A61F 5/0125 403/92 |
| 2007/0262207 A1* | 11/2007 | Morgenstern | B64C 9/22 244/214 |
| 2008/0191099 A1* | 8/2008 | Werthmann | B64C 23/065 244/199.4 |
| 2008/0308683 A1* | 12/2008 | Sankrithi | B64C 23/076 244/199.4 |
| 2009/0148302 A1* | 6/2009 | Leahy | B64C 27/463 416/224 |
| 2009/0166477 A1* | 7/2009 | Bousfield | B64C 3/18 244/218 |
| 2009/0224107 A1* | 9/2009 | McLean | B64C 23/069 244/199.4 |
| 2009/0302151 A1* | 12/2009 | Holmes | B64C 3/56 244/49 |
| 2010/0019080 A1* | 1/2010 | Schweighart | B64C 3/56 244/49 |
| 2010/0051742 A1* | 3/2010 | Schweighart | B64C 3/56 244/49 |
| 2010/0084516 A1* | 4/2010 | Eberhardt | B64C 23/072 244/218 |
| 2011/0180657 A1* | 7/2011 | Gionta | B64C 3/56 244/49 |
| 2012/0032023 A1* | 2/2012 | Bousfield | B64C 3/56 244/49 |
| 2012/0112005 A1* | 5/2012 | Chaussee | B64C 23/072 244/123.1 |
| 2012/0292436 A1* | 11/2012 | Karem | B64C 3/56 244/49 |
| 2013/0001367 A1* | 1/2013 | Boer | B64C 23/072 244/199.3 |
| 2013/0056579 A1* | 3/2013 | Schlipf | B64C 3/56 244/49 |
| 2013/0099060 A1* | 4/2013 | Dees | B64C 3/56 244/199.4 |
| 2014/0361539 A1* | 12/2014 | Carter | F03D 7/06 290/44 |
| 2015/0097087 A1* | 4/2015 | Sakurai | B64C 3/40 244/201 |
| 2015/0191243 A1* | 7/2015 | Fujimoto | B64C 17/00 244/7 R |
| 2016/0090170 A1* | 3/2016 | Thompson | B64C 3/56 701/3 |
| 2016/0185444 A1* | 6/2016 | Gionta | B64C 35/008 244/49 |
| 2016/0244145 A1* | 8/2016 | Thompson | B64C 23/072 |
| 2016/0251075 A1* | 9/2016 | Thompson | B64C 23/072 244/198 |
| 2017/0029089 A1* | 2/2017 | Alexander | B64C 3/40 |
| 2017/0043864 A1* | 2/2017 | Axford | B64C 3/56 |
| 2017/0355438 A1* | 12/2017 | Bishop | B64C 3/56 |
| 2017/0355444 A1* | 12/2017 | Lorenz | B64C 3/56 |
| 2018/0057144 A1* | 3/2018 | Lorenz | B64C 3/56 |
| 2018/0237127 A1* | 8/2018 | Hewson | B64C 3/187 |
| 2018/0334238 A1* | 11/2018 | Winkelmann | B64C 3/56 |
| 2019/0248468 A1* | 8/2019 | Lorenz | B64C 3/56 |
| 2019/0322351 A1* | 10/2019 | Lorenz | F16D 55/38 |
| 2019/0337605 A1* | 11/2019 | Lorenz | B64C 3/56 |
| 2019/0359311 A1* | 11/2019 | Lorenz | B64C 3/56 |
| 2019/0359312 A1* | 11/2019 | Lorenz | B64C 3/56 |
| 2019/0389559 A1* | 12/2019 | Lorenz | B64C 3/56 |
| 2020/0001974 A1* | 1/2020 | Lorenz | B64C 3/56 |
| 2020/0377224 A1* | 12/2020 | Brighton | B64C 3/56 |
| 2020/0398969 A1* | 12/2020 | Lorenz | B64C 3/56 |

OTHER PUBLICATIONS

Translation Certificate and English Translation of German Search Report issued in DE 10 2018 115 699.5, dated Apr. 4, 2019, 8 pages.

* cited by examiner

ARRESTING SYSTEM FOR ARRESTING A FIRST AIRCRAFT COMPONENT RELATIVE TO A SECOND AIRCRAFT COMPONENT

CROSS REFERENCE TO RELATED APPLICATION

This application claims priority to and incorporates by reference German Application Number DE 10 2018 115699.5, filed Jun. 28, 2018.

BACKGROUND

The present disclosure relates to an arresting system and, in particular, a latching system for arresting a first aircraft component relative to a second aircraft component. The first and second aircraft components may be a foldable wing tip portion and a fixed wing of a wing for an aircraft. Alternatively, the first and second aircraft components may be a cargo door and a related fuselage structure to which the cargo door is movably mounted.

The present disclosure also relates to a wing for an aircraft comprising such an arresting system and, in particular, to a foldable wing including a fixed wing and a foldable wing tip portion. The present disclosure also relates to an aircraft comprising such an arresting system and/or such a wing.

Such a wing comprises a fixed wing for being mounted to a fuselage, and a foldable wing tip portion mounted to the fixed wing via a tip hinge or tip hinges rotatable about a tip hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the hinge axis extends in a horizontal plane and/or in parallel to a chord line and/or in parallel to the wing surface and/or in a flight direction of the aircraft. Alternatively, when the foldable wing tip portion is foldable rearwards, the hinge axis extends in a vertical direction and/or in a wing thickness direction and/or in a direction transverse or perpendicular to the wing surface.

The wing may also comprise an actuation unit for actuating the foldable wing tip portion for movement about the tip hinge axis relative to the fixed wing, i.e. for movement between the extended and the folded positions. The actuation unit may be formed in various ways, e.g. as a rack and pinion drive, and may be mounted between the fixed wing and the foldable wing tip portion near the tip hinge axis.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

In the extended position the foldable wing tip portion is usually secured by an individual arresting device. Various designs of such an arresting device have been proposed in the art, such as latching devices including a latch bolt engaging a corresponding bore.

SUMMARY

The disclosure is directed toward an arresting device that allows to arrest the foldable wing tip portion with respect to the fixed wing in a very precise position which at the same time can be engaged in a simple and quick manner.

An arresting system for arresting a first aircraft component relative to a second aircraft component, comprising a first aircraft component, a second aircraft component, a first hook and a second hook.

The first aircraft component is movable relative to the second aircraft component between a first position and a second position, wherein the first position might be arrested by the arresting system. The first hook is C-shaped or U-shaped and has a first leg portion, an opposite second leg portion and a first recess between the first and second leg portions. The first leg portion is pivotally mounted to the first aircraft component via a first hinge having a first hinge axis.

Similar to the first hook, the second hook is C-shaped or U-shaped and has a third leg portion, an opposite fourth leg portion and a second recess between the third and fourth leg portions. The third leg portion is pivotally mounted to the second aircraft component via a second hinge having a second hinge axis which may be parallel to the first hinge axis.

The first hook and the second hook are configured to be moved, in particular pivoted, relative to one another between an arrested position and a release position. In the arrested position the first and second hooks are engaged and relative movement of the first and second aircraft components is inhibited, while in the release position the first and second hooks are disengaged and relative movement of the first and second aircraft components is allowed. The first and second hooks may have a curved outer surface such that the engaged first and second hooks have a circular or oval contour, when viewed in a cross section across the first and/or second hinge axes.

In the arrested position, the first and second hooks are engaged in one of the two following ways: either the first leg portion is received in the second recess in a form-fitting manner while the third leg portion is received in the first recess in a form-fitting manner, or the second leg portion is received in the second recess in a form-fitting manner while the fourth leg portion is received in the first recess in a form-fitting manner. In both cases, the engagement is such that the surface of the first hook rests against the surface of the second hook along a continuous contact surface. Form-fitting manner in this connection is understood to be as a complete form-fitting without any gaps or intermediate sections out of contact between the surfaces of the first and second hook. In particular, not only the concave surfaces but also the convex surfaces of the first and second hooks are—at least partially—in contact with the respective other one of the first and second hook.

Such an arresting system is capable of arresting the foldable wing tip portion with respect to the fixed wing in a very precise position and at the same time can be engaged in a simple and quick manner.

According to an exemplary embodiment, the contact surface has an S-shape with a tangent-continuous course, when viewed in a cross section across the first and/or second hinge axes. The S-shape may have only one, central inflection point. This allows a maximum contact surface with maximum friction and smooth engagement.

According to an exemplary embodiment, the first hook has a first inner surface directed to and defining the first recess, wherein the second hook has a second inner surface directed to and defining the second recess, and wherein the contact surface extends along between 50% and 100%, more specifically between 75% and 100%, and further between 90% and 100%, of the first inner surface and/or of the second inner surface, when viewed from the inside to the outside of the engaged first and second hooks, and may be along the entire first inner surface and/or second inner surface. That is, the contact surface extends from a central inflection point along the first inner surface and/or the second inner surface until another inflection point occurs at the first inner surface or at the second inner surface, which brings the first and second inner surfaces out of contact and, thus, terminates the contact surface. This promotes a maximum contact surface with maximum friction and smooth engagement.

According to yet another exemplary embodiment, the first leg portion is wider than the second leg portion and/or the third leg portion is wider than the fourth leg portion, when viewed in a cross section across the first and/or second hinge axes. This serves a stable engagement and easy movement of the hooks.

According to yet another exemplary embodiment, the first and second hooks are formed and arranged such that, when the first and second hooks are moved from the release position to the arrested position, the first and second hooks are not only pivoted relative to one another about the respective first and/or second hinge, but are also moved translationally, when viewed in a cross section across the first and/or second hinge axes. Such translational movement might be necessary or advantageous for the first and second hook to be fully engaged quickly.

According to yet another exemplary embodiment, a tip of the first leg portion, or a center of a tip area of the first leg portion, and/or a tip of the third leg portion, or a center of a tip area of the third leg portion projects beyond a straight connection line directly connecting the first hinge to the second hinge, may be connecting the first hinge axis to the second hinge axis. In such a way, the first and second hooks encompass one another by a great angle, so that a tight engagement is obtained.

According to yet another exemplary embodiment, in the arrested position the first and second hooks are engaged such that the first leg portion is received in the second recess in a form-fitting manner while the third leg portion is received in the first recess in a form-fitting manner. This engagement option allows the first and second hinge to be close to one another during engagement.

In particular, a first guiding structure may be mounted to the first aircraft component and a second guiding structure may be mounted to the second aircraft component, wherein in the arrested position, the fourth leg portion is engaged between the first leg portion and the first guiding structure, and the second leg portion is engaged between the third leg portion and the second guiding structure. The first and second guiding structures may have concave surfaces adapted to the outer surface of the first and second hook. The first and second guiding structures secure the engaged hooks in the arrested position, because, when a tension load is applied between the first and second aircraft components and thus between the engaged first and second hook, the second leg portion is clamped between the third leg portion and the second guiding structure, and the fourth leg portion is clamped between the first leg portion and the first guiding structure, as soon as the second and fourth leg portions are slightly, elastically deformed by the tension load. This clamping of the second and fourth leg portion prevents the engaged hooks from disengaging under load, and thus leads to a very strong and stiff connection.

According to yet another exemplary embodiment, in the arrested position the first and second hooks are engaged such that the second leg portion is received in the second recess in a form-fitting manner while the fourth leg portion is received in the first recess in a form-fitting manner. This engagement option allows the first and second hinge to be further away from one another during engagement.

In particular, the arrested position the second leg portion and the fourth leg portion may engage one another such that they encompass one another by more than 90° with respect to a main load direction of the main external loads applied to the arresting system. The first and second hooks may also be formed and arranged such that they must be pivoted by more than 90° to be moved from the release position to the arrested position. By such a far-encompassing engagement the engaged hooks are secured in the arrested position, because, when a tension load is applied between the first and second aircraft components and thus between the engaged first and second hook, the second leg portion is clamped between the third leg portion and the fourth leg portion, and the fourth leg portion is clamped between the first leg portion and the second leg portion, as soon as the second and fourth leg portions are slightly, elastically deformed by the tension load. This clamping of the second and fourth leg portion prevents the engaged hooks from disengaging under load, and thus leads to a very strong and stiff connection.

According to yet another exemplary embodiment, the arresting system further comprises a locking device for locking the first and second hooks in the arrested position. The locking device may include a first bore in the first hook and a second bore in the second hook. The first and second bores may extend in a perpendicular direction across to the first and/or second hinge axes. The first and second bores are aligned when the first and second hooks are in the arrested position. The locking device further includes a locking pin configured to be inserted into the aligned first and second bores to inhibit disengagement of the first and second hooks. Such a locking device prevents unintended releasing of the arresting system.

The disclosure also relates to a wing for an aircraft. The wing comprises a fixed wing and a foldable wing tip portion mounted to the fixed wing via a tip hinge rotatable about a tip hinge axis between an extended position and a folded position. The wing further comprises an arresting system according to any of the afore-described embodiments, wherein the first aircraft component is the foldable wing tip portion, the second aircraft component is the wing, the first position is the extended position, and the second position is the folded position. The first and second hooks are formed and arranged such that they can be moved into the arrested position when the foldable wing tip portion is in the extended position. The first and second hinge axes may extend in parallel to the tip hinge axis. The features and effects described above in connection with the arresting system apply vis-à-vis to the aircraft.

According to an exemplary embodiment, the arresting system is arranged spaced apart from the tip hinge axis in a wing thickness direction of the fixed wing. The arresting system may be arranged lower than the tip hinge axis with respect to a normal position of an aircraft on the ground. In such a way, tension load is applied to the arresting system when aerodynamic forces act on the wing tip, wherein the tension load is minimized when the distance of the arresting system from the tip hinge axis is maximized.

The disclosure also relates to an aircraft comprising the arresting system according to any of the afore-described embodiments and/or comprising the wing according to any of the afore-described embodiments. The features and effects described above in connection with the arresting system and the wing apply vis-à-vis to the aircraft.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1:
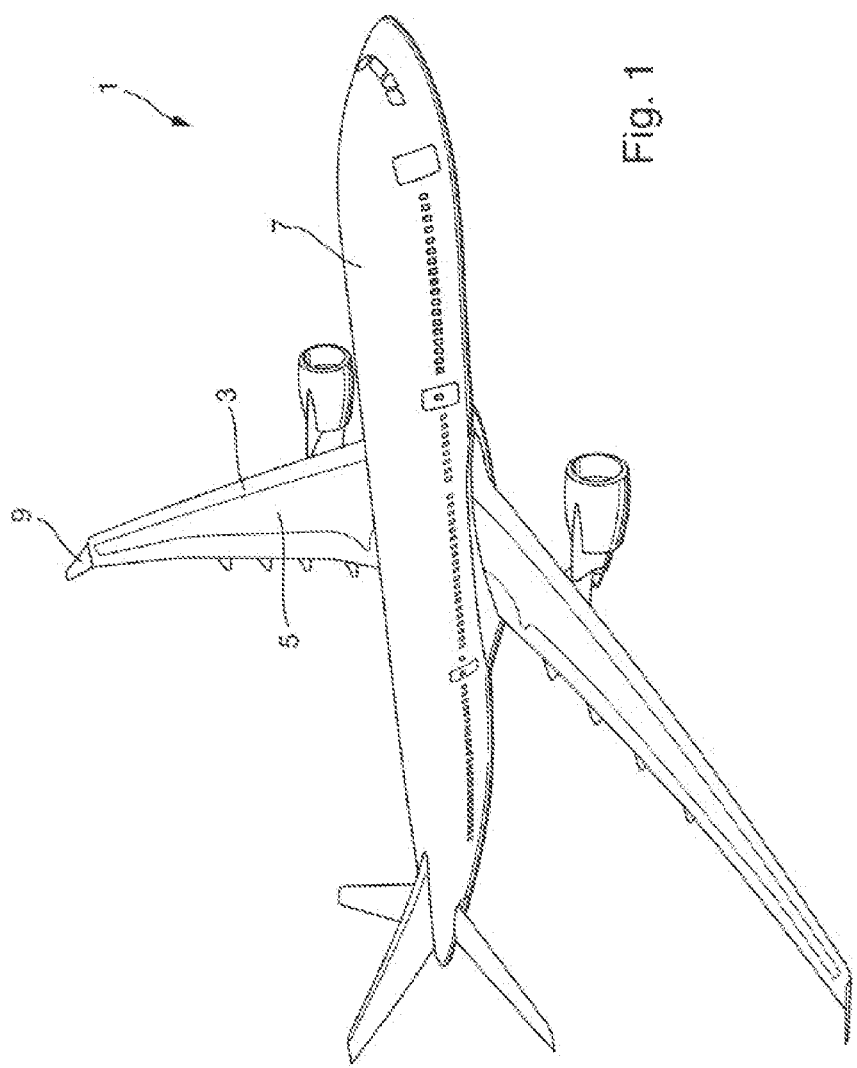
FIG. 1 is a perspective view of an aircraft according to an embodiment of the invention.

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
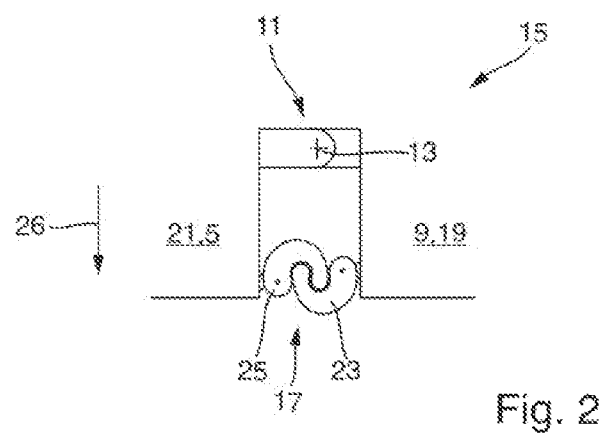
FIG. 2 is a side view of the wing shown in FIG. 1 with a focus on the tip hinge and the arresting system.

FIG. 2 illustrates the wing 3 of the aircraft 1 shown in FIG. 1 in further detail. The foldable wing tip portion 9 is mounted to the fixed wing 5 via a tip hinge 11 rotatable about a tip hinge axis 13 between an extended position 15 (see FIG. 2) and a folded position (not shown). In the extended position 15 the foldable wing tip portion 9 extends as a continuous extension of the fixed wing 5 in a common plane with the fixed wing 5, wherein in the folded position the foldable wing tip portion 9 extends upwards in order to reduce the overall span of the aircraft 1. The hinge axis 13 extends in parallel to a chord line and in a flight direction of the aircraft 1.

The wing further comprises an arresting system 17 for arresting a first aircraft component 19, namely the foldable wing tip portion 9, relative to a second aircraft component 21, namely the fixed wing 5. Besides the foldable wing tip portion 9 and the fixed wing 5, the arresting system 17 comprises a first hook 23 and a second hook 25. The arresting system 17 is arranged spaced apart from the tip hinge axis 13 in a wing thickness direction 26 of the fixed wing 5.

The first hook 23 is C-shaped and has a first leg portion 27, an opposite second leg portion 29 and a first recess 31 between the first and second leg portions 27, 29. The first leg portion 27 is pivotally mounted to the foldable wing tip portion 9 via a first hinge 33 having a first hinge axis 35. The second hook 25 is C-shaped and has a third leg portion 37, an opposite fourth leg portion 39 and a second recess 41 between the third and fourth leg portions 37, 39. The third leg portion 37 is pivotally mounted to the fixed wing 5 via a second hinge 43 having a second hinge axis 45 in parallel to the first hinge axis 35. First and second hinge axes 35, 45 are in parallel to the tip hinge axis 13.

The first hook 23 and the second hook 25 are configured to be moved relative to one another between an arrested position 47 and a release position 49. In the arrested position 47 the first and second hooks 23, 25 are engaged and movement of the foldable wing tip portion 9 relative to the fixed wing 5 is inhibited, while in the release position 49 the first and second hooks 23, 25 are disengaged and movement of the foldable wing tip portion 9 relative to the fixed wing 5 is allowed. The first and second hooks 23, 25 are formed and arranged such that they can be moved into the arrested position 47 when the foldable wing tip portion 9 is in the extended position 15.

Figure 3:
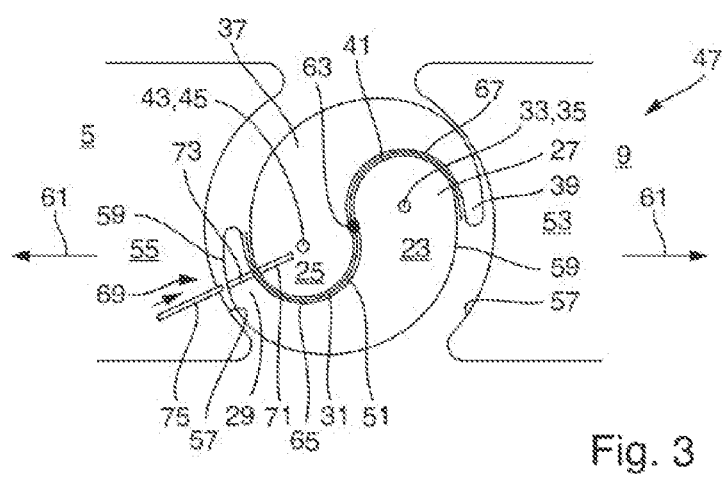
FIG. 3 is a cross-sectional view of a first embodiment of an arresting system as used in the wing shown in FIG. 2, and FIGS. 4a and 4b are cross-sectional views of a second embodiment of an arresting system as used in the wing shown in FIG. 2.
Figure 4A:
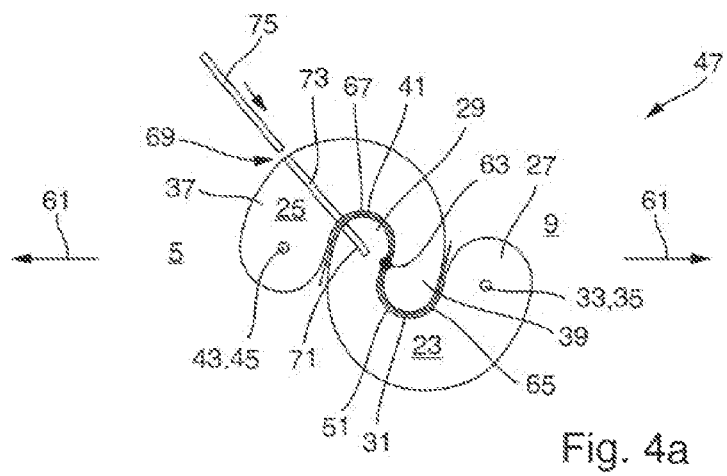

In the arrested position 47 the first and second hooks 23, 25 are engaged according to one of the two embodiments shown in FIGS. 3 and 4. In the embodiment shown in FIG. 3, the first leg portion 27 is received in the second recess 41 in a form-fitting manner while the third leg portion 37 is received in the first recess 31 in a form-fitting manner. In contrast, in the embodiment shown in FIG. 4a the second leg portion 29 is received in the second recess 41 in a form-fitting manner while the fourth leg portion 39 is received in the first recess 31 in a form-fitting manner. In both cases, the engagement is such that the surface of the first hook 23 rests against the surface of the second hook 25 along a continuous contact surface 51.

In the embodiment shown in FIG. 3, the arresting system 17 further comprises a first guiding structure 53 that is mounted to the foldable wing tip portion 9 and a second guiding structure 55 that is mounted to the fixed wing 5. In the arrested position 47, the fourth leg portion 39 is engaged between the first leg portion 27 and the first guiding structure 53, and the second leg portion 29 is engaged between the third leg portion 37 and the second guiding structure 55. Both first and second guiding structures 53, 55 have concave surfaces 57 adapted to the outer surfaces 59 of the first and second hook 23, 25.

In the embodiment shown in FIG. 3, in the arrested position 47 the second leg portion 29 and the fourth leg portion 39 engage one another such that they encompass one another by more than 90° with respect to a main load direction 61 of the main external loads applied to the arresting system 17. Further, the first and second hooks 23, 25 are formed and arranged such that they must be pivoted by more than 90° to be moved from the release position 49 to the arrested position 47.

Figure 4B:
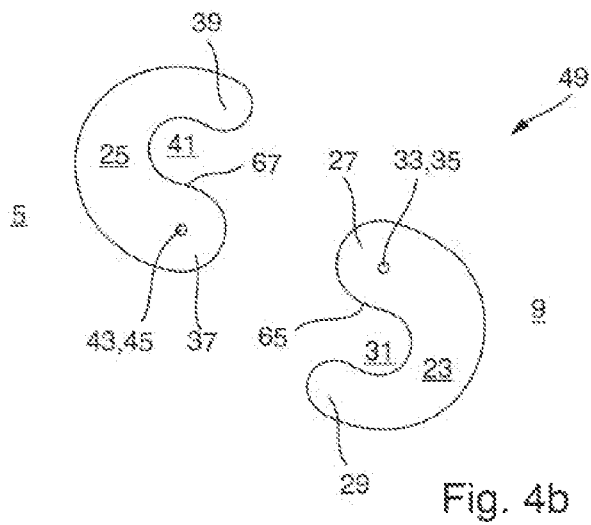

In both embodiments shown in FIG. 3, and FIGS. 4a and 4b, the contact surface 51 has an S-shape with a tangent-continuous course, when viewed in a cross section across the first and second hinge axes 35, 45. The S-shape has only one, central inflection point 63. The first hook 23 has a first inner surface 65 directed to and defining the first recess 31, wherein the second hook 25 has a second inner surface 67 directed to and defining the second recess 41, and wherein the contact surface 51 extends along the entire first inner surface 65 and second inner surface 67. I.e. the contact surface 51 extends from the central inflection point 63 along the first inner surface 65 and the second inner surface 67 until another inflection point occurs at the first inner surface 65 or at the second inner surface 67, which brings the first and second inner surfaces 65, 67 out of contact and, thus, terminates the contact surface 51.

Further, in both embodiments, the first leg portion 27 is wider than the second leg portion 29 and the third leg portion 37 is wider than the fourth leg portion 39, when viewed in a cross section across the first and second hinge axes 35, 45.

Also true for both embodiments, but specifically for the embodiment shown in FIGS. 4a and 4b, the first and second hooks 23, 25 are formed and arranged such that, when the first and second hooks 23, 25 are moved from the release position 49 to the arrested position 47, the first and second hooks 23, 25 are not only pivoted relative to one another about the respective first and second hinge 33, 43, but are also moved translationally, when viewed in a cross section across the first and second hinge axes 35, 45. Further, a tip of the first leg 27 portion and a tip of the third leg portion 37 projects beyond a connection line connecting the first hinge (33) to the second hinge (43).

The arresting system 17 of both the embodiment shown in FIG. 3, and the embodiment shown in FIGS. 4*a* and 4*b*, further comprises a locking device 69 for locking the first and second hooks 23, 25 in the arrested position 47. The locking device 69 includes a first bore 71 in the first hook 23 and a second bore 73 in the second hook 25. The first and second bores 71, 73 extend in a direction perpendicular to the first and second hinge axes 35, 45. The first and second bores 71, 73 are aligned when the first and second hooks 23, 25 are in the arrested position 47. The locking device 69 further includes a locking pin 75 configured to be inserted into the aligned first and second bores 71, 73 to inhibit disengagement of the first and second hooks 23, 25.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An arresting system for arresting a first aircraft component relative to a second aircraft component, comprising:
    a first aircraft component and a second aircraft component, wherein the first aircraft component is movable relative to the second aircraft component between a first position and a second position,
    a first hook having a first leg portion, an opposite second leg portion and a first recess between the first and second leg portions, wherein the first leg portion is pivotally mounted to the first aircraft component via a first hinge,
    a second hook having a third leg portion, an opposite fourth leg portion and a second recess between the third and fourth leg portions, wherein the third leg portion is pivotally mounted to the second aircraft component via a second hinge,
    wherein the first hook and the second hook are configured to move relative to one another between an arrested position, where the first and second hooks are engaged and inhibiting relative movement of the first and second aircraft components, and a release position, where the first and second hooks are disengaged and allowing relative movement of the first and second aircraft components,
    wherein in the arrested position, the first and second hooks are engaged such that either the first leg portion is received in the second recess in a form-fitting configuration while the third leg portion is received in the first recess in a form-fitting configuration, or the second leg portion is received in the second recess in a form-fitting configuration while the fourth leg portion is received in the first recess in a form-fitting configuration, so that a surface of the first hook rests against the surface of the second hook along a continuous contact surface.

2. The arresting system according to claim 1, wherein the continuous contact surface is a tangent-continuous course surface.

3. The arresting system according to claim 1, wherein the first hook has a first inner surface directed to and defining the first recess, wherein the second hook has a second inner surface directed to and defining the second recess, and wherein the contact surface extends along between 50% and 100% of the first inner surface and/or of the second inner surface.

4. The arresting system according to claim 1, wherein the first leg portion is wider than the second leg portion, and/or the third leg portion is wider than the fourth leg portion.

5. The arresting system according to claim 1, wherein the first and second hooks are formed and arranged such that, when the first and second hooks are moved from the release position to the arrested position, the first and second hooks are not only pivoted relative to one another about the respective first and/or second hinge, but are also moved translationally.

6. The arresting system according to claim 1, wherein a tip of the first leg portion and/or a tip of the third leg portion projects beyond a connection line connecting the first hinge to the second hinge.

7. The arresting system according to claim 1, wherein in the arrested position the first and second hooks are engaged such that the first leg portion is received in the second recess in a form-fitting configuration while the third leg portion is received in the first recess in a form-fitting configuration.

8. The arresting system according to claim 7, wherein a first guiding structure is mounted to the first aircraft component and a second guiding structure is mounted to the second aircraft component, wherein in the arrested position, the fourth leg portion is engaged between the first leg portion and the first guiding structure, and the second leg portion is engaged between the third leg portion and the second guiding structure.

9. The arresting system according to claim 1, wherein in the arrested position the first and second hooks are engaged such that the second leg portion is received in the second recess in a form-fitting configuration while the fourth leg portion is received in the first recess in a form-fitting configuration.

10. The arresting system according to claim 9, wherein in the arrested position the second leg portion and the fourth leg portion engage one another to encompass one another by more than 90° with respect to a main load direction of main external loads applied to the arresting system.

11. The arresting system according to claim 9, wherein the first and second hooks are formed and arranged to pivot by more than 90° to move from the release position to the arrested position.

12. The arresting system according to claim 11, further comprising a locking device for locking the first and second hooks in the arrested position, wherein the locking device includes a first bore in the first hook and a second bore in the second hook, wherein the first and second bores are aligned when the first and second hooks are in the arrested position, wherein the locking device further includes a locking pin configured to insert into the aligned first and second bores to inhibit disengagement of the first and second hooks.

13. A wing for an aircraft, comprising:
a fixed wing,
a foldable wing tip portion mounted to the fixed wing via a tip hinge rotatable about a tip hinge axis between an extended position and a folded position,
wherein the wing further comprises an arresting system according to claim 1, wherein the first aircraft component is the foldable wing tip portion, the second aircraft component is the wing, a first position is the extended position and a second position is the folded position, and
first and second hooks are formed and arranged to be moved into the arrested position when the foldable wing tip portion is in the extended position.

14. The wing according to claim 13, wherein the arresting system is arranged spaced apart from the tip hinge axis in a wing thickness direction of the fixed wing.

15. An aircraft comprising the arresting system according to claim 1, the aircraft comprising a wing having a fixed wing, and a foldable wing tip portion mounted to the fixed wing via a tip hinge rotatable about a tip hinge axis between an extended position and a folded position,
wherein the first aircraft component is the foldable wing tip portion, the second aircraft component is the wing, the first position is the extended position and the second position is the folded position, and
the first and second hooks are formed and arranged to be moved into the arrested position when the foldable wing tip portion is in the extended position.

16. The arresting system according to claim 1, wherein the contact surface extends along between 75% and 100% of the first inner surface and/or of the second inner surface.

17. The arresting system according to claim 1, wherein the contact surface extends along between 90% and 100% of the first inner surface and/or of the second inner surface.

18. The arresting system according to claim 1, wherein the contact surface extends along the entire first inner surface and/or second inner surface.

19. The arresting system according to claim 1, wherein a tip of the first leg portion and/or a tip of the third leg portion projects beyond a straight connection line directly connecting the first hinge axis to the second hinge axis.

* * * * *